United States Patent [19]

Kuttel

[11] 4,422,304
[45] Dec. 27, 1983

[54] TRANSPORTATION OF PERISHABLE PRODUCTS

[75] Inventor: Brian W. Kuttel, Capetown, South Africa

[73] Assignee: TransFRESH Corporation, Salinas, Calif.

[21] Appl. No.: 406,631

[22] Filed: Aug. 9, 1982

Related U.S. Application Data

[62] Division of Ser. No. 213,004, Dec. 4, 1980, Pat. No. 4,356,702.

[30] Foreign Application Priority Data

Dec. 10, 1979 [ZA] South Africa ..................... 79/6691
Jun. 26, 1980 [ZA] South Africa ..................... 80/3803
Nov. 6, 1980 [ZA] South Africa ..................... 80/6855

[51] Int. Cl.³ ............................................. F24F 3/16
[52] U.S. Cl. ............................................. 62/78; 62/240
[58] Field of Search .................................. 62/78, 240

[56] References Cited

U.S. PATENT DOCUMENTS

| | | | |
|---|---|---|---|
| 3,089,313 | 5/1963 | Fix ........................................ | 62/239 |
| 3,102,777 | 9/1963 | Brody et al. ......................... | 62/78 |
| 3,102,779 | 9/1972 | Gallagher, Jr. ...................... | 62/240 |
| 3,692,100 | 9/1972 | Bedrosian et al. .................. | 62/78 |
| 4,003,728 | 1/1977 | Rath ...................................... | 62/78 |

FOREIGN PATENT DOCUMENTS

| | | |
|---|---|---|
| 1164791 | 9/1969 | United Kingdom . |
| 1279646 | 6/1972 | United Kingdom . |
| 1435620 | 5/1976 | United Kingdom . |
| 1448481 | 9/1976 | United Kingdom . |
| 1458165 | 12/1976 | United Kingdom . |
| 1471722 | 4/1977 | United Kingdom . |
| 1498839 | 1/1978 | United Kingdom . |
| 2057109 | 3/1981 | United Kingdom . |

*Primary Examiner*—Ronald C. Capossela
*Attorney, Agent, or Firm*—Kendrick, Netter & Bennett

[57] ABSTRACT

Modern refrigerated container ships have a hold in which insulated containers carrying perishable products are stacked and are connected to a source of cold air, which is circulated through the containers to cool the products. This system has disadvantages such as the dehydration of the products by the constant circulation of the cold air. The invention provides that the containers in such a conveyance are sealed and their interiors contain a modified atmosphere being cooled by circulation through a heat exchange unit which is sealed in the container and which receives cold air from the exterior source. The invention can analogously be applied to the warming of products.

8 Claims, 5 Drawing Figures

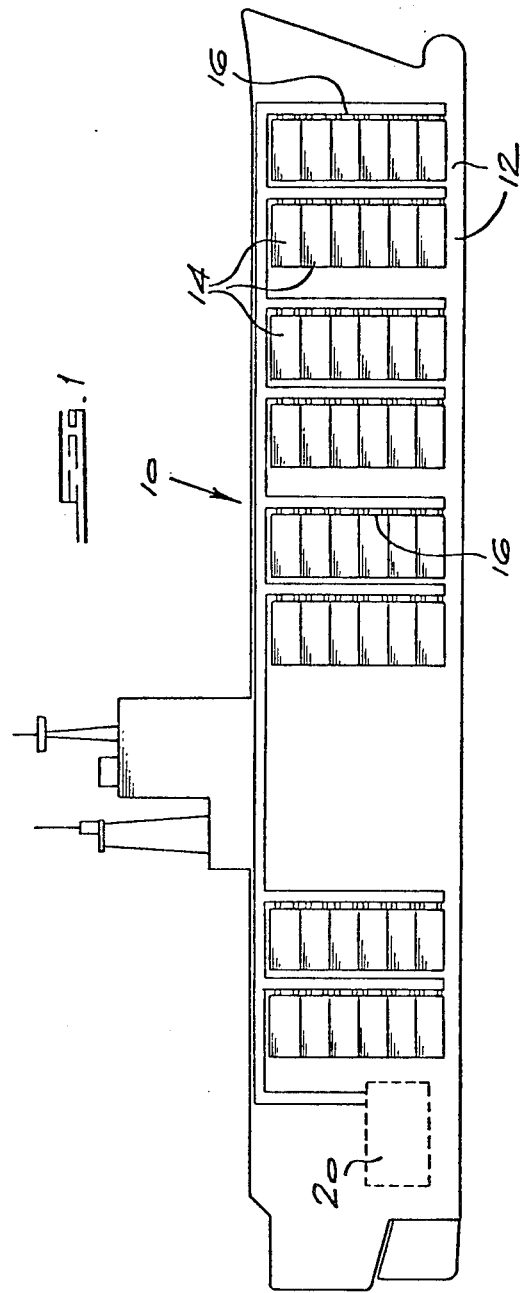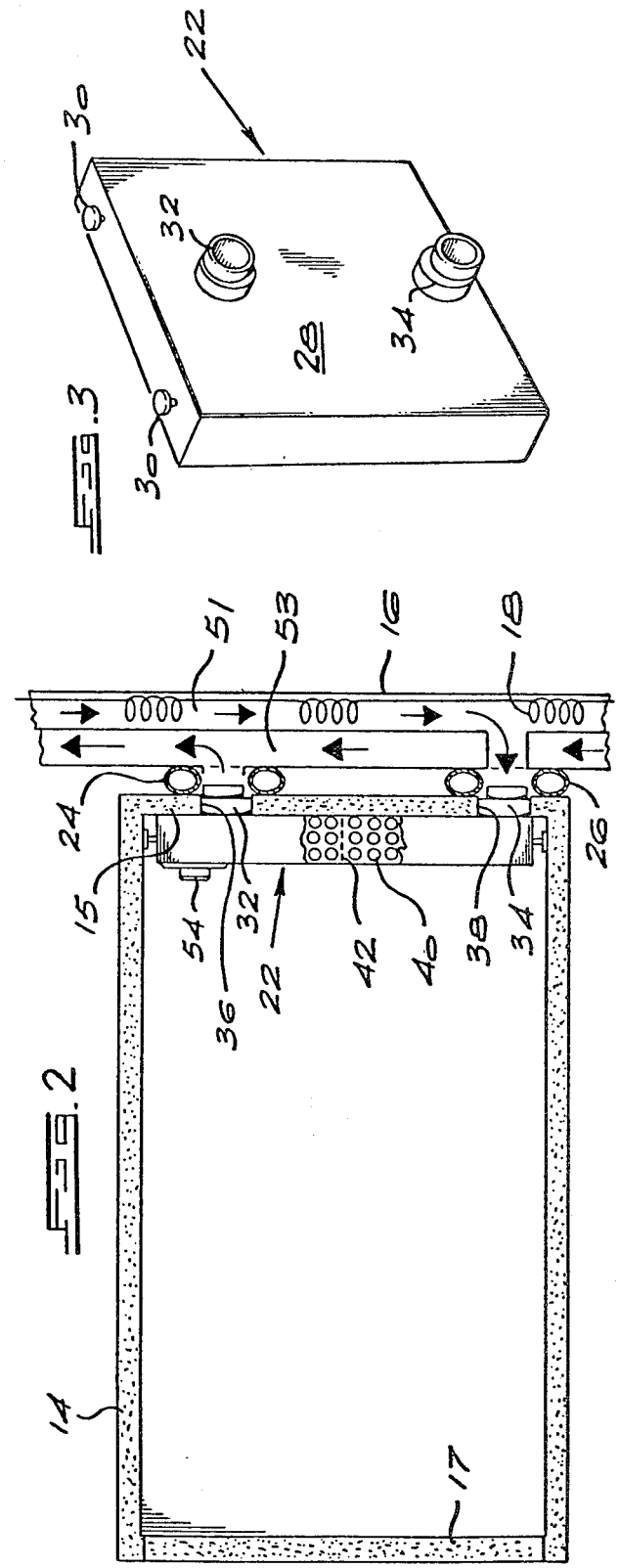

TRANSPORTATION OF PERISHABLE PRODUCTS

This is a division of application Ser. No. 213,004, filed Dec. 4, 1980, now U.S. Pat. No. 4,356,702.

BACKGROUND OF THE INVENTION

This invention relates to the transportation of perishable products such as vegetables, fruit, and other agricultural and industrial products which must be maintained in a controlled atmosphere if they are to arrive in good condition at a distant destination. Usually it is necessary or desirable to cool or even freeze such products but in certain cases it is necessary to warm them if they or their containers are exposed en route to an excessively cold ambient atmosphere.

It is also known that certain fresh products are best stored in a modified atmosphere—that is, not the normal mixture of gases and vapour in the ambient atmosphere, but a special mixture which may contain preservatives and other substances in proportions best suited to the particular product. Much is already known about the modified atmosphere best suited to many varieties of the food products transported in bulk about the world, and the application of modified atmosphere technology is now widely practised in several continents. Naturally it is necessary, if a modified atmosphere is applied, to seal the container in which the products and the gas mixture are housed. for certain perishable products it is possible that the modified atmosphere includes or comprises a liquid.

In the past decade, with the advent of containerisation, several large container ships particularly adapted for the transportation of perishable products have been designed and put into commission. A typical refrigerated container ship of this type plying between Europe and Southern Africa can carry a total of 2 762 TEU (twenty-foot equivalent units) standard containers, of which 712 so-called fruit containers capable of being chilled and 176 containers capable of being frozen are carried below deck. At the data of filing this application seven container ships of approximately similar capacity are in operation between Europe and Southern Africa, and other such ships in other routes. A full description of one such ship is contained in an article entitled "Containerschiff 'Transvaal'", published in the German periodical, Hansa, volume 18 (1978), 1473-1485.

Each of these ships is equipped with a cold air refrigeration system serving the insulated holds in which the containers (themselves insulated) are stacked. A typical hold accommodates 360 containers, packed in nine-high stacks, twenty such stacks extending in a row thwartship, and two such rows of stacks making up the hold. Each stack of nine containers is known as a slot.

Each slot is served by a refrigeration column located alongside the central zone of one of the vertically aligned ends of the containers, and contains its own cooling coils and ducting for the supply of cold air and the withdrawal of air once it has passed through the containers. The temperature at which the cooling coil operates can be regulated individually for each refrigeration column so that different products, requiring differing degrees of cooling, can be accommodated in different slots; but each container in the same slot is subjected to cooling by air at the same temperature.

The containers used below decks hitherto have been sealed and insulated to prevent heat losses and, to allow the circulation of cold air, have been formed in the end facing the refrigeration column with two apertures, one near the upper edge and the other near the lower edge. The refrigeration column is fitted with a series of inflatable rings and, when the container is in position and the rings and inflated, each ring surrounds an aperture in the container wall. The rings are inflated once the slot is occupied, and provide a seal between the mouth of the apertures and a corresponding aperture in the ducting of the regrigeration column.

Hitherto it has not been feasible to apply modified atmosphere to the containers transported in the holds of such ships since the cooling of the containers has called for the closed-cycle circulation of cold air from the ship's refrigeration system. One of the consequences has been that the constant exposure of the products packed in the containers to the cold air circulating through them has dehydrated the products substantially on the relatively long voyages undertaken by the ships, so that the products do not arrive in their best condition, and certain products particularly susceptible to dehydration have not been transportable at all.

Containers are known which incorporate, in one of the container bodies, a refrigeration unit which is operated by external electrical power supplied by a cable which is plugged into a terminal in the container itself. The container is sealed and insulated and it is possible for it to contain a modified atmosphere which is cooled by the refrigeration unit. The refrigeration unit is self-contained and the container therefore discharges to the atmosphere the heat generated by the operation of the unit. These containers cannot be used in the hold of a refrigerated container ship of the kind described above since the heat generated by them would be discharged into the hold and would raise the temperature to unacceptable levels. Moreover, the individual refrigeration units, which require relatively frequent maintenance, would be largely inaccessible when the containers are stacked in the hold.

SUMMARY OF THE INVENTION

An object of the invention is to overcome or mitigate the abovementioned problem, and in particular to allow products which are subjected to a modified atmosphere to be carried below deck by container ships or similar conveyances.

According to the invention a method of transporting perishable products in containers in a conveyance having a source supplying a first fluid at a constant temperature to a plurality of containers includes the step of subjecting the first fluid, when it is inside a container, to heat exchange with a second fluid while maintaining the first and second fluids separate from each other, the second fluid comprising a modified atmosphere suitable for the preservation of the products.

The second fluid, making up the modified atmosphere, may be subjected to forced circulation in the container to assist the heat exchange process and to ensure that it circulates uniformly.

A particular and surprising result achieved by the invention and not possible hitherto is that different atmospheres can be maintained in containers located in the same slot in a refrigerated container vessel of the type described above. This enables a greater variety of products to be transported in the same vessel than hitherto.

Moreover, the invention has the result, in relation to the existing container vessels, that the spent air with-drawn from the containers is not contaminated by moisture or gases derived from the products being cooled, so that the cooling air need not be renewed and the refrigeration system is easier to maintain.

The invention also provides a sealed and insulated container for the transportation of perishable products and having an aperture for the entry from the exterior of a first fluid and an aperture for its discharge, the container accommodating a heat exchange unit in which the first fluid is adapted to circulate and to undergo heat exchange with a second fluid sealed in the container and separated from the first fluid.

A further aspect of the invention provides for removable installation in a container for the transportation of perishable products, a heat exchange unit comprising a housing, means to support the housing in the container, an entry and a discharge manifold in the housing for fluid adapted to be passed from the exterior through the housing, a series of conduits connecting the manifolds, and means to force a fluid in the container through the housing to undergo heat exchange by passing over the conduits. The material of the heat exchanger is preferably a light metal such as aluminium.

In a preferred form the heat exchange unit comprises a first manifold connected to the entry aperture in the wall of the container to receive the first fluid from the exterior, a series of tubular conduits whose interior communicates at one end with the manifold and at the other end with a second manifold connected to the discharge aperture in the wall of the container, and a housing containing the conduits and provided with an entrance for a fluid sealed in the container and an exit for such fluid after it has passed over the surfaces of the conduits.

The conduits are preferably arranged substantially horizontally on both sides of a central vertical duct divided into an upper and a lower manifold, the conduits on each side having one end let into the central duct and their other ends let into a vertically extending header, the two headers being at the outer edges of the unit. The housing may contain a fan or pump to force fluid in the interior of the container through the housing to undergo heat exchange.

BRIEF DESCRIPTION OF THE DRAWINGS

FIG. 1 is a simplified semi-schematic elevation view of a refrigerated container ship in which a cargo of containers is stacked below deck;

FIG. 2 is a simplified longitudinal sectioned view on a larger scale of a single container located in a stack in a hold of the ship of FIG. 1 and in working relationship with a refrigeration column fixed in the ship, a heat exchange unit in the container being seen in side view with a portion of the visible side broken away;

FIG. 3 is a simplified perspective view on to the front of the heat exchange unit located in the container seen in FIG. 2;

DESCRIPTION OF A PREFERRED EMBODIMENT

Figure 4:
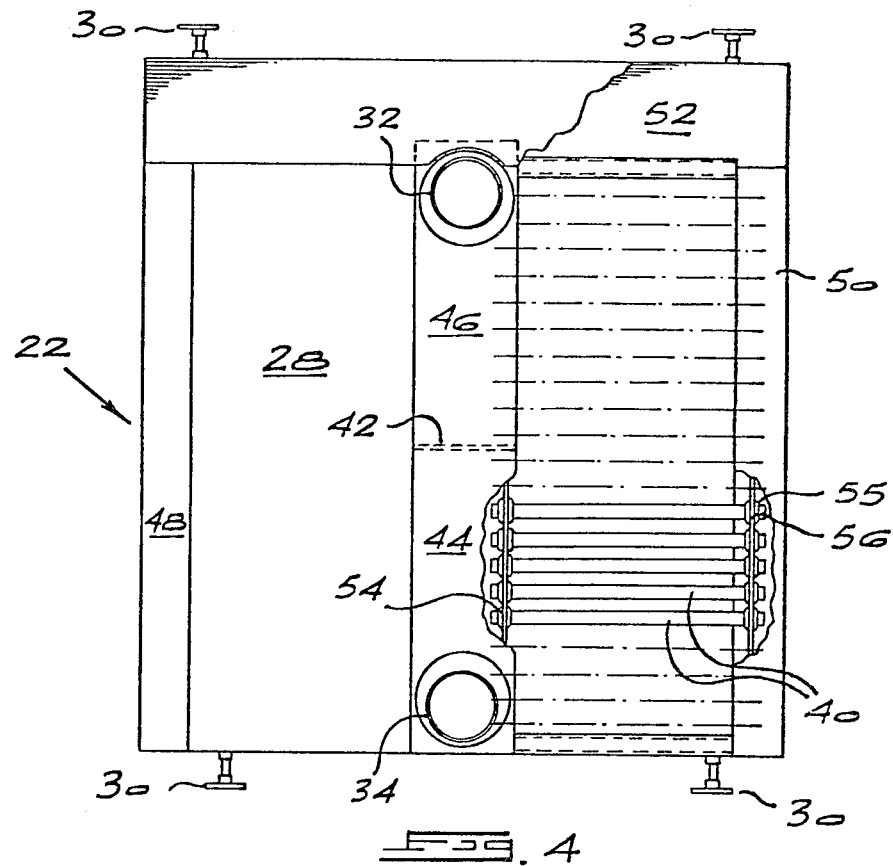
FIG. 4 is a front elevation view of the heat exchange unit of FIGS. 2 and 3 on an enlarged scale and with a portion of its front wall broken away.

In a typical refrigerated container ship 10 as shown in FIG. 1, a number of insulated holds 12 is provided, each accommodating a series of rows of stacked standard containers 14, each row extending thwartwards. Each vertical stack, defining a slot, is served by a column 16 (FIG. 2) which comprises a series of ducts and chambers in which are contained a cooling coil 18 and other equipment. The refrigeration columns are served by one or more centrally located refrigeration units 20 (FIG. 1) located at a convenient station.

Each container in the refrigerated holds has insulated walls and contains a heat exchange unit 22 located at its inner end adjacent the end wall 15, which in turn is adjacent the refrigeration column 16. The outer end wall 17 contains a hinged door through which the heat exchange unit is inserted initially into the container.

As is seen schematically in FIG. 2, each refrigeration column includes on its exterior, between its surface and the adjacent end wall 15 of each container 14 in the slot, an upper inflatable ring 24 and a lower such ring 26. Each ring 24,26 surrounds an aperture in the end wall of the container and provides a seal between this aperture and a corresponding aperture in the refrigeration column 16 so that cold air may enter the container through the lower ring 26 and the same air, after undergoing heat exchange, may leave it through the upper ring 24 to return to the refrigeration system.

Figure 5:
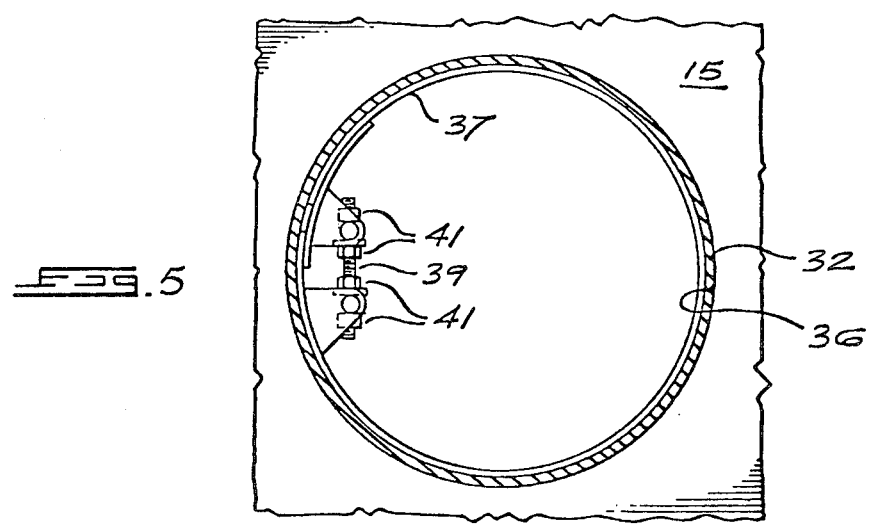
FIG. 5 is a sectioned view on an enlarged scale through a part of a neoprene spigot contained in the heat exchange unit of FIGS. 3 and 4, showing how it is secured in an aperture in the end wall of a container.

As is seen in FIGS. 2 to 5, the heat exchange unit 22 comprises an outer housing 28 which defines a generally flattish body on which are mounted upper and lower adjustable feet 30 on threaded studs which can be rotated in threaded sockets to lock the unit in place against the floor and roof of the container when it is in position at the inner end wall 15 of the container. Facing such inner end wall is an upper spigot 32 of a flexible material such as neoprene, a similar lower spigot 34 also being provided. In the container end wall 15, the upper spigot 32 extends into a circular aperture 36 and is sealed against the edge of the aperture by an expanding retaining ring 37, seen in FIG. 5, which is actuated by a threaded stud 39 and nuts 41. Similarly, the lower spigot 34 is sealingly held against the edge of a lower aperture 38 by an expanding retaining ring.

The heat exchange unit 22 is made principally of aluminium plates and aluminium tubes 40. The plates define a central vertical chamber divided by a horizontal plate 42 into a lower entry manifold 44 and an upper discharge manifold 46. The lower tubes 40 communicate at their inner ends with the manifold 44 and the upper tubes with the manifold 46. The tubes 40 in the left-hand side of the unit as viewed in FIG. 5 communicate with a vertical header 48 and those on the right with a vertical header 50. The headers 48,50 are closed at their upper ends. A plenum box 52 in which a fan 54 (FIG. 4) is mounted extends across the full width of the unit and opens at its base into the space in the housing 28 which receives the tubes 40. The base of the housing 22 is open to form an exit for the gases in the container which are drawn into the unit and forced downwards over the tubes 40 by the suction of the fan 54 and ejected into the body of the container from the base of the unit.

It has been found possible to make the heat exchange unit relatively economically, fabrication procedures being minimised by mounting the tubes 40 in rubber grommets 55 seated in apertures 56 in the plates at the ends of the tubes 40.

Screens (not illustrated) are provided in the housing at the base of the spigots 32,34 to trap undesired particles.

It will be clear that cold air entering the container 14 through the aperture 38 from a cold air duct 51 in the column 16 passes through the manifold 44 into the lower tubes 40 and thence to the lower parts of the headers 48,50. It rises in the headers and passes through the upper tubes 40 to enter the discharge manifold 46, whence it leaves the container through the upper aperture 36 and returns to a discharge duct 53 in the refrigeration column 16 to be recycled.

The gas in the container 14 is circulated by the fan 54 in a closed cycle through the interior of the container and the interior of the housing 22 of the heat exchange unit, so that products stored in the container (in such a manner as to leave suitable airways for the gas) are continuously cooled. This gas will be the particular modified atmosphere selected for the products in the container at the time.

Naturally it would be possible, if the circumstances so required, for the same container and heat exchange unit to be traversed by warm air if the circumstances require the container to be warmed rather than chilled.

If the container ship were to be adapted so that a chilled or warmed liquid, rather than air, were circulated by the cooling or heating system through the columns 16, the identical or very similar heat exchange units 22 could be used in the containers 14. A more sophisticated sealing arrangement than the inflatable rings 24,26 may in this case be necessary to prevent leakages. Suitable liquids are the secondary refrigerants such as eutectic solutions of calcium chloride or brine or the glycols.

The sequence of operations in the packing and transportation of the perishable products will be clear from the above description. An empty container 14 is first opened and fitted with a unit 22, and the perishable products are then loaded into it in the conventional fashion. A modified atmosphere suitable to the particular product is introduced into the container, which is then closed and sealed. The containers are loaded into the hold of the container ship. Each slot served by a refrigeration column 16 may be filled with containers carrying different products provided they merely require cooling fluid at the same temperature. When the slot is full the inflatable rings 24,26 are activated to provide seals between each container and the refrigeration column 16 and the fans 54 (which will normally be electrically driven by conventional electrical means) are set in motion. Cold air passing through the unit 22 from the refrigeration post 16 is subjected to heat exchange to cool the gases of the modified atmosphere circulating through the unit 22. The process is continued until the ship reaches its destination, when the refrigeration system is stopped, the fans 54 are deactivated, the rings 24,26 are deflated, and the containers are unloaded.

After the unloading, if it is required to cool a container for the remainder of its journey, it is possible to connect to the container a so-called clip-on refrigeration unit, which is a known electrically operated device which is removably attached to the exterior of the container and provides cold air to the interior of the heat exchange unit 22, so that the modified atmosphere is not disturbed.

On the return journey, if a modified atmosphere in the container is not required, the heat exchange unit 22 may be removed. Several units 22 may be packed in a container if they are themselves being transported.

I claim:

1. A sealed and insulated container adapted for the transportation of perishable food products inside said container on conveyance means having a source supplying a temperature-modifying fluid at a predetermined temperature for entry into said container from its exterior, said container having an aperture for the entry from the exterior of said temperature-modifying fluid at a predetermined temperature and an aperture for its discharge, said container including a heat exchange unit in which said temperature-modifying fluid is adapted to circulate and to undergo heat exchange with a second fluid comprising a modified atmosphere suitable for direct contact with, and for preservation of at least one perishable food product inside said container, said second fluid being sealed in the container and maintained separate from said temperature-modifying fluid.

2. The container of claim 1 in which the heat exchange unit is removably located adjacent an end wall of the container.

3. The container of claim 1 in which the heat exchange unit comprises a first manifold connected to the entry aperture, a series of conduits whose interior communicates at one end with the first manifold and at the other end with a second manifold connected to the discharge aperture, and a housing containing the conduits and provided with an entrance for a fluid sealed in the container and an exit port for such fluid after it has passed over the surface of the conduits.

4. The container of claim 3 in which the conduits are arranged substantially horizontally on both sides of a central vertical duct divided into an upper and a lower manifold, the conduits on each side having one end let into the central duct and their other ends let into a vertically extending header, the two headers being at the outer edges of the unit.

5. The container of claim 4 in which the housing contains means to force the second fluid through the housing.

6. For removable installation in a sealable, insulated container adapted for the transportation of perishable food products inside said container on conveyance means having a source supplying a temperature-modifying fluid at a predetermined temperature for entry into said container from its exterior, a heat exchange unit comprising a housing, means to support the housing in said container, an entry and a discharge manifold in the housing for admitting a temperature-modifying fluid at a predetermined temperature adapted to be passed from the exterior through the housing, a series of conduits connecting the manifolds, and means to force a modified atmosphere suitable for direct contact with, and for preservation of at least one perishable food product inside said container from said container through the housing to undergo heat exchange with said temperature-modifying fluid by passing over the conduits while maintaining said temperature-modifying fluid and said modified atmosphere separate from each other.

7. The heat exchange unit of claim 6 in which the manifolds are arranged as an upper and a lower manifold and the conduits are arranged substantially horizontally on both sides of the manifolds, the conduits having one end let into one of the manifolds and the other end let into a vertically extending header, there being such a header at both outer edges of the unit.

8. The heat exchanger unit of claim 6 or claim 7, the conduits and housing being of alumiuium and each conduit being supported sealingly at each end in a resilient grommet seated in an aperture in a plate.

* * * * *